United States Patent

[11] 3,603,842

| [72] | Inventor | Bernard Edwin Ash<br>Bexleyheath, England |
|---|---|---|
| [21] | Appl. No. | 868,565 |
| [22] | Filed | Oct. 22, 1969 |
| [45] | Patented | Sept. 7, 1971 |
| [73] | Assignee | International Standard Electric Corp.<br>New York, N.Y. |
| [32] | Priority | Nov. 7, 1968 |
| [33] | | Great Britain |
| [31] | | 52771/68 |

[54] ACCELERATION CONTROL OF MACHINES
2 Claims, 1 Drawing Fig.

[52] U.S. Cl. .................................................. 317/5,
318/326, 318/398, 322/31
[51] Int. Cl. .................................................. H02p 7/04
[50] Field of Search ......................................... 318/397,
398, 326, 463, 396; 317/5; 322/19, 31; 330/82, 92,
93, 96

[56] References Cited
UNITED STATES PATENTS

| 2,300,960 | 11/1942 | Porter | 322/31 X |
| 2,650,996 | 9/1953 | Jaeschke | 317/5 X |
| 2,850,654 | 9/1958 | Jaeschke | 318/326 X |
| 3,026,148 | 3/1962 | Ruof | 317/5 X |
| 3,418,528 | 12/1968 | Watanabe | 317/5 |

Primary Examiner—J. D. Miller
Assistant Examiner—Harry E. Moose, Jr.
Attorneys—C. Cornell Remson, Jr., Walter J. Baum, Paul W. Hemminger, Percy P. Lantzy, Philip M. Bolton, Isidore Togut and Charles L. Johnson, Jr.

ABSTRACT: An acceleration control circuit for machinery includes a first transistor coupled to a tachogenerator on the machine to develop a signal proportional to rate of acceleration. An emitter coupled pair of transistors provides an output voltage to control the machinery, with a portion of the output fed back to increase the signal from the first stage. This permits a rapid response to small acceleration changes and a slower response to large changes.

PATENTED SEP 7 1971 3,603,842
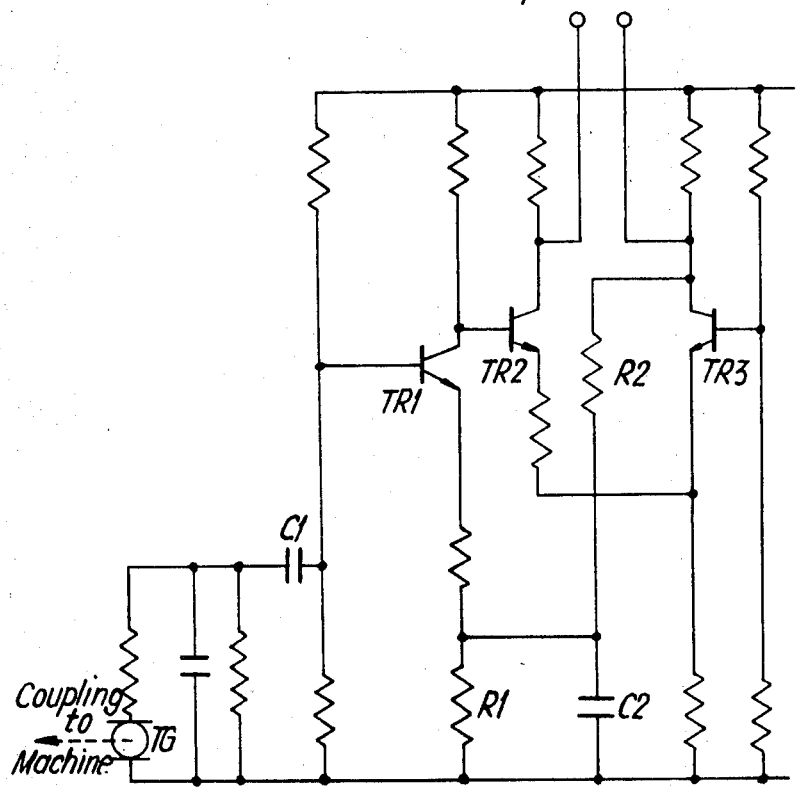
Inventor
BERNARD E. ASH
By Edward Goldberg
Attorney

ACCELERATION CONTROL OF MACHINES

BACKGROUND OF THE INVENTION

This invention relates to improvements in electronic circuits for the control of acceleration and deceleration of machinery and in particular to circuits for use in association with electromagnetic clutches or brakes.

A clutch or a brake is not itself responsive to speed, therefore the control loop necessary to control the acceleration or deceleration has a direct torque versus acceleration or deceleration relationship. Where the machine conditions are such that the torque required to produced the desired acceleration or deceleration is a small portion of the total torque required to drive the machine it becomes difficult to achieve stable acceleration control. This is because the maximum loop gain dictated by the effect of the phase changing elements in the loop, for example the solenoid of an electromagnetic clutch, must be related to the change of torque which causes acceleration or deceleration and must of necessity be low in comparison to the total torque. The effect of this is that changes in the load on the machine cause significant changes in the rate of acceleration or deceleration.

SUMMARY OF THE INVENTION

It is the object of the invention to provide a circuit which gives stable control of the acceleration or deceleration and where the rate of acceleration or deceleration is not materially affected by the load of the machine.

According to the invention there is provided a circuit for the control of acceleration or deceleration of machinery, which circuit comprises a first transistor coupled to the output of a tachogenerator driven by the machinery, which first transistor develops an output voltage at its collector which is proportional to the rate of acceleration of the tachogenerator, this output voltage being modified by a feedback loop which is such as to increase the output voltage so that the machine control has a rapid response to small fluctuations in the acceleration and a slower response to larger fluctuations in the acceleration, which fluctuations are caused by different loads on the machinery.

BRIEF DESCRIPTION OF THE DRAWINGS

The FIG. shows a circuit diagram of the invention.

DESCRIPTION OF THE PREFERRED EMBODIMENT

Transistor TR1 develops a voltage at its collector which is basically proportional to the rate of acceleration of the tachogenerator, TG, associated with the machine to be controlled. The tachogenerator supplies an input signal to transistor TR1 proportional to the speed of rotation of the machine with the coupling circuit including capacitor C1 providing the rate of acceleration. This voltage is modified by the other components in the circuit in a manner which will be explained later.

Transistor TR2 and TR3 are an emitter coupled pair which together produce two outputs at their respective collectors which deviate by equal and opposite voltages in proportion to the voltage signal present at the collector of TR1. The combined output signal from the pair of transistors is fed to a suitable control element for the machine. A portion of the voltage at the collector of TR3 is fed back by the resistors R1 and R2 to modify the output of TR1, the direction of this change is such as to cause an increase in the output voltage of TR1. The value of capacitor C2 is chosen such that the time for the increase in the output voltage of TR1 is substantially longer than the time constant of the phase changing elements in the control loop of the machine. The capacitor thus has a relatively low impedance to high frequency signals.

Thus, at rate of change which are significant to the control loop stability, the output of the circuit will be substantially less than will be the case if the controlling signal is maintained for a longer period. The effect of this is that the circuit can respond rapidly to small fluctuations caused by changes in the acceleration of the machine, but the long term output of the circuit can adjust itself over a much wider range to compensate for much larger variations in torque demanded by the total load on the machine.

By changing the value of resistors R1 and R2 it is possible to vary the total amount of the output signal which is subjected to the time delay. Thus a circuit is produced which can be adjusted to accommodate a very wide range of operating conditions covering the magnitude of the required accelerating torque, the machine driving torque and the time constant of the phase changing elements in the control loop of the machine to achieve stable operation without loss of sensitivity.

What is claimed is:

1. In a circuit for the control of acceleration or deceleration of machinery including a tachogenerator coupled to the machinery to provide a voltage proportional to the speed of rotation of the machinery, a first transistor coupled to said tachogenerator, the collector of said transistor developing a voltage proportional to the rate of acceleration of the tachogenerator and output means providing an output voltage to control said machinery, the improvement comprising feedback means coupling a portion of said output voltage to said first transistor, said feedback means including an emitter-coupled pair of transistors providing said output voltage, the base of one of the transistors in the pair being connected to the collector of the first transistor, said output voltage from said pair of transistors including respective outputs from each transistor of said pair which deviate by equal and opposite amounts in proportion to the voltage at the collector of the first transistor, the output of the other transistor of the pair having a feedback connection to the first transistor so as to increase said voltage at the collector, the time to increase the voltage of the first transistor being substantially longer than the time constant of the phase changing elements in the control loop of the machine so that the machine control has a rapid response to small fluctuations in the acceleration caused by different loads on the machinery and a slower response to larger fluctuations.

2. The circuit of claim 1 wherein the collectors of said pair of transistors include respective output connections providing said output voltage and the feedback means includes a voltage divider connected between the collector electrode of said other transistor and a reference connection, a portion of the voltage divider being connected to said first transistor, and a capacitor connected between said voltage divider portion and said reference connection.